April 21, 1970    J. W. FIX ET AL    3,507,294
FLUID FLOW CONTROL APPARATUS
Filed Dec. 14, 1966    3 Sheets-Sheet 1

INVENTORS
JOHN W. FIX
CHARLES E. HALLUM
WARREN F. KAUFMAN
BY
Harry W. Hargis III
AGENT

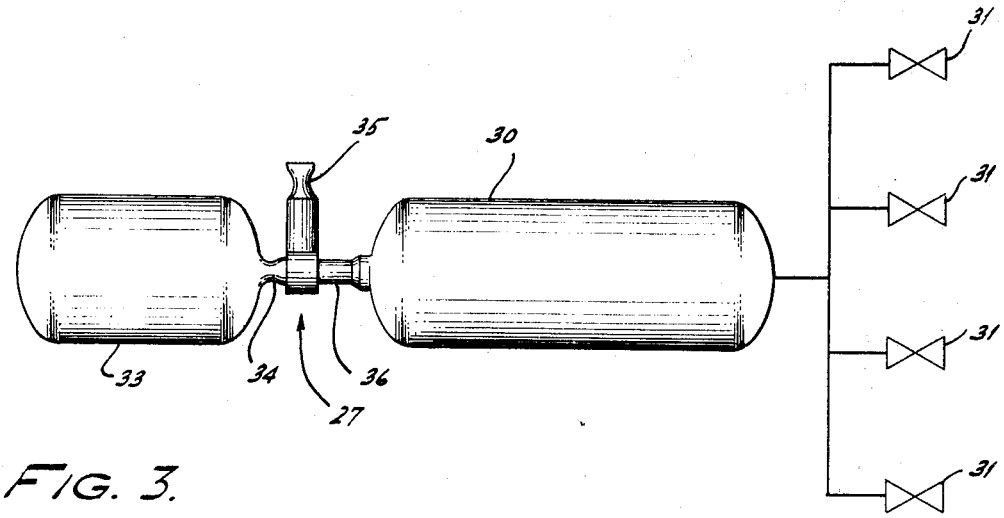
FIG. 3.
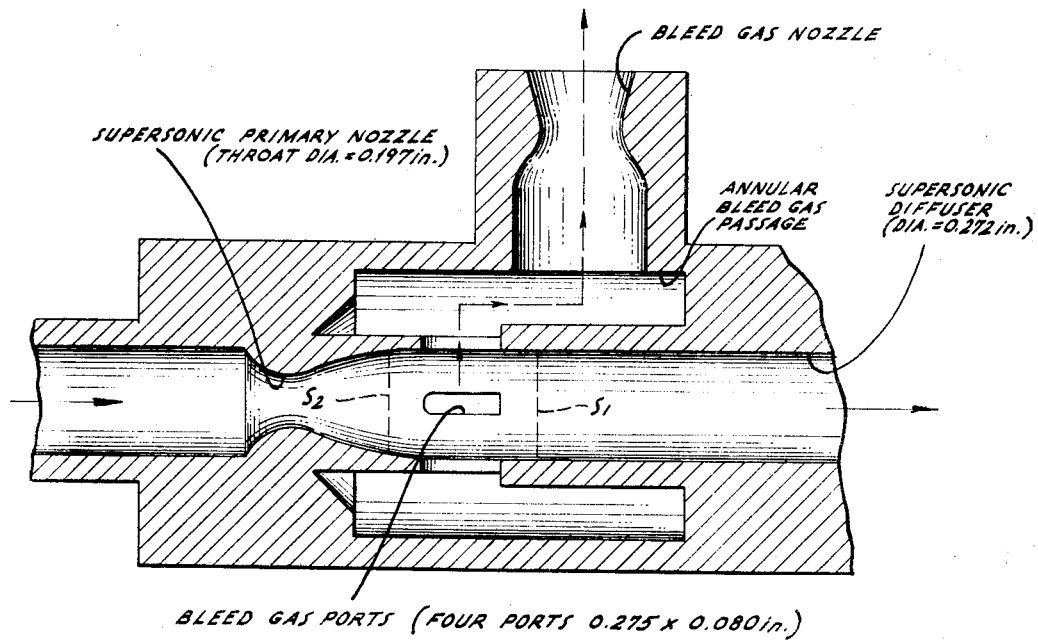
FIG. 4. PRESSURE REGULATOR
INVENTORS
JOHN W. FIX
CHARLES E. HALLUM
WARREN F. KAUFMAN
BY
AGENT INVENTORS
JOHN W. FIX
CHARLES E. HALLUM
WARREN F. KAUFMAN
BY
Harry W. Hargis III
AGENT United States Patent Office 3,507,294
Patented Apr. 21, 1970

3,507,294
FLUID FLOW CONTROL APPARATUS
John W. Fix, Marblehead Neck, Mass., and Charles E. Hallum, Villa Park, and Warren F. Kaufman, Santa Ana, Calif., assignors to Philco-Ford Corporation, Philadelphia, Pa., a corporation of Delaware
Filed Dec. 14, 1966, Ser. No. 601,679
Int. Cl. F15d 1/04
U.S. Cl. 137—81.5                6 Claims

ABSTRACT OF THE DISCLOSURE

A fluid flow control apparatus including a nozzle for receiving fluid under pressure and for discharging the same through conduit means into a receptacle within which fluid pressure is to be controlled. A bleed conduit is connected to the conduit means so that fluid is caused to flow from the nozzle through the conduit means under conditions of lower pressure in the pressurized receptacle, and is caused to flow from the nozzle through the bleed conduit under conditions of higher pressure in the pressurized receptacle.

---

This invention relates to fluid flow control apparatus, and is directed especially to improved through-flow means for achieving pressure regulation of gaseous fluids.

It is a general objective of the invention to provide a fluid pressure regulator that requires no moving parts.

It is a further object of the invention to provide a fluid pressure regulator that is reliable under conditions of extreme acceleration and vibration.

Fluid flow control apparatus embodying the invention, and achieving the foregoing as well as other objectives, includes a nozzle for receiving fluid under pressure and for discharging the same through suitable conduit means. A receptacle within which fluid flow is to be controlled is connected to the conduit means, and a bleed conduit also is connected to the conduit means. The construction and arrangement is such that fluid is caused to flow from the nozzle through the conduit means under conditions of lower pressure in the controlled region, and is caused to flow from the nozzle through the bleed conduit under conditions of higher pressure in the controlled region. Fluid flows from the nozzle alternately through the conduit means and through the bleed conduit, whereby automatically to maintain predetermined fluid pressure in the controlled region.

The invention is featured by the combination of a nozzle for receiving fluid under pressure and for discharging the same at supersonic velocity, with a supersonic diffuser disposed downstream of the nozzle and in spaced relation thereto. Duct means interconnects the nozzle and the diffuser, and a bleed conduit communicates with the duct means in a region thereof intermediate the nozzle and the diffuser. The apparatus is operable to form a shock wave movable between the region of the inlet to the diffuser and the region of the outlet of the nozzle, in response to changes in fluid pressure at the outlet of the diffuser. The construction and arrangement is such that fluid is caused to flow through the diffuser when the shock wave is positioned at the diffuser inlet, and is caused to flow through the bleed conduit when the shock wave is positioned at the nozzle outlet. In this way substantially constant pressure at the diffuser outlet is achieved.

Advantageously, response of the pressure regulator to variations in pressure at its outlet requires only shifting of the fluid stream. Since there are no moving parts, operation of the regulator is characterized by fast response and high reliability. Moreover, the regulator functions efficiently in such adverse environments as extremely high or low temperatures, while being unaffected by extreme accelerations and vibrations.

While of broader applicability, the invention has particular utility in the field of on-board controls for guided missiles, which controls are subject to the above mentioned extreme environmental conditions in the operation of such missiles.

The manner in which objects and advantages of the invention may best be achieved will be understood from the following description, taken in light of the accompanying drawing, in which:

FIGURE 3 is a partially diagrammatic showing of a particular application of flow control apparatus of the kind shown in FIGURE 1;

FIGURE 4 is an enlarged fragmentary and more detailed sectional view of apparatus of the type seen in FIGURES 1 and 3 and to which the invention is particularly directed.

Figure 1:
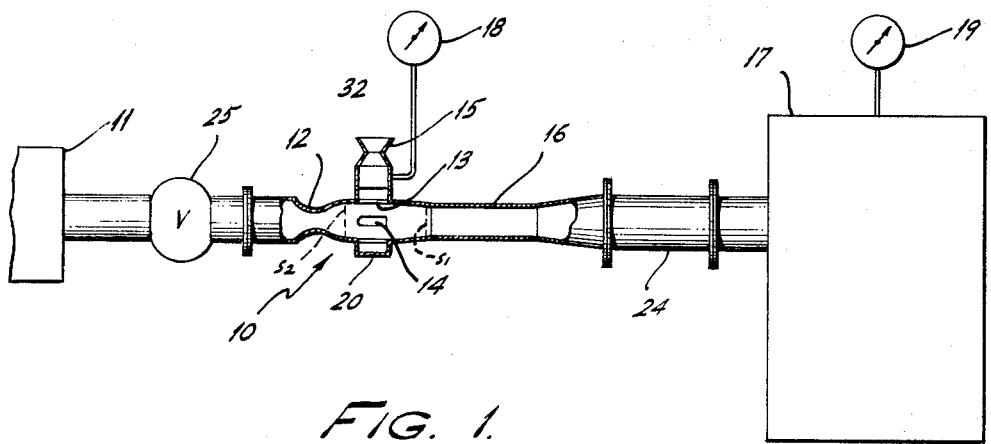
FIGURE 1 is an elevational-sectional view of apparatus embodying the invention.

With more particular reference to the drawing, and first to FIGURE 1, a pressure regulator 10 embodying the invention is illustrated somewhat diagrammatically in combination with apparatus for demonstrating its operating characteristics under cold flow conditions. A source 11 of high pressure gas, such for example as dry air, is disposed, through the agency of a control valve 25, in gas flow communication with the primary nozzle 12 of regulator 10. A duct 13 is provided downstream of primary nozzle 12 and includes slotted gas bleed ports 14, and a bleed gas nozzle 15 disposed in fluid flow communication with bleed ports 14 by means of an annular gas passage 20. A supersonic diffuser or pressure recovery tube 16 is provided downstream of duct 13. A receiver tank 17 to be filled and maintained at a predetermined gas pressure is connected to the outlet of diffuser 16 by a flanged adapted section 24.

Figure 2:
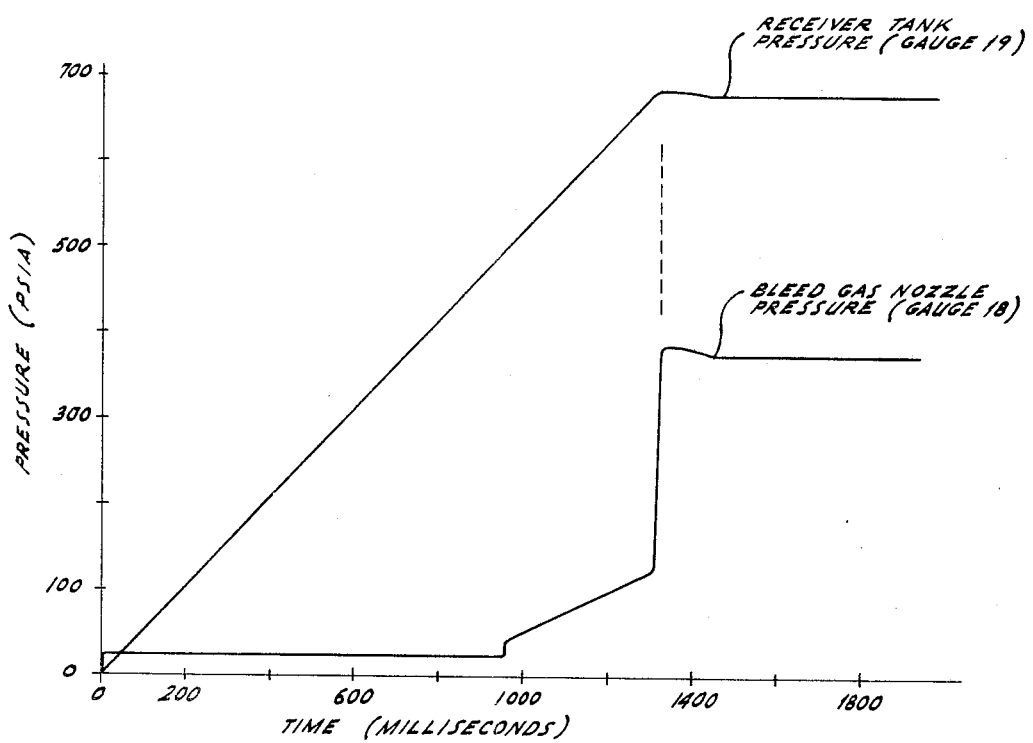
FIGURE 2 is a chart illustrating some performance characteristics of apparatus seen in FIGURE 1.

In operation of the illustrated apparatus, under conditions of maximum gas flow into receiver tank 17, gas is fed from source 11 to primary nozzle 12. Given proper pressure at the source, as is considered with particular reference to FIGURES 2 and 4, this gas leaves nozzle 12 at supersonic speed and the construction and arrangement of the regulator 10 is such that a shock wave $S_1$ is formed in the gas stream as it enters recovery tube 16. Some critical dimensions of this pressure regulator are seen in FIGURE 4 which will be described later. After passing through the region of shock wave formation and entering recovery tube 16, the gas stream is decelerated to subsonic speed, and recovers static pressure. Static pressure balance is achieved along the flow boundary of the free jet region, so that static pressure is low at the entrance ports 14 to bleed nozzle 12, with resultant small gas leakage through the bleed nozzle under maximum flow conditions.

Under conditions of no-flow through pressure recovery tube 16, as is achieved when tank 17 has reached its design pressure, e.g. about 675 lbs. p.s.i.a. in this embodiment, the shock wave is disposed in the region of the exit of supersonic nozzle 12, as shown at $S_2$, upstream of bleed ports 14 and nozzle 15. With the shock wave in this position, the static head at the ports 14 is increased, and the velocity head is decreased, so that the gas stream flows through the bleed ports and nozzle as it leaves the nozzle. In other words, the velocity of the stream is insufficient to carry it past the bleed ports.

To illustrate gas pressure regulation achieved by this system, for a gas (air) inlet pressure of 1200 p.s.i.a., gas pressures (p.s.i.a.) along the gas flow system were measured by gauges 18 and 19 while the system was used to fill a 462 cubic inch capacity receiver tank shown at 17. These measurements are plotted, versus time in milliseconds, to form the curves seen in FIGURE 2. Inspection of the curves reveals that pressure control is achieved rapidly upon reaching the desired pressure level (about 675 p.s.i.a. in this embodiment), and is thereafter maintained accurately.

By appropriately configuring the free jet region and the bleed nozzle, as seen, for example, in FIGURE 4 hereinafter to be more fully described, the total gas pressure at the outlet of recovery tube or diffuser 16 under conditions of no-flow into tank 17 may be made closely to match the total gas pressure at maximum flow into tank 17, whereby there may be achieved substantially constant pressure in the receiver tank 17, or such other load as may be undergoing regulation.

The invention also has especial utility in demand pressurization systems utilizing constant pressure gas sources. A system of this type is illustrated diagrammatically in FIGURE 3, and includes a liquid expulsion tank 30 of known design, for example a hydraulic-pneumatic accumulator, connected to gas flow pressure regulator 27 embodying the invention. This regulator is of the general type shown in FIGURE 1, and illustrated in more detail in FIGURE 4.

The liquid side of tank 30 is connected to supply an array of liquid injector valves 31, each subject to being opened and closed at different times in accordance with demands of components (not shown) with which they are associated. The pressurization system is energized by a solid propellent gas generator 33, many of which are known, and connected to the inlet nozzle 34 of pressure regulator 27. A bleed gas nozzle 35 is provided as in the previous embodiment, and the supersonic diffuser portion 36 of the regulator provides connection to liquid expulsion tank 31.

Since response of pressure regulator 27 is rapid, substantially constant pressure can be maintained in expulsion tank 30, throughout the demands made thereon through operation of valves 31. It will of course be understood that demands on the system will not exceed the capability of generator 33.

In FIGURE 4, there are illustrated, by way of example, various critical dimensions of a pressure regulator of the type seen in the preceding figures, as well as some details of construction which enhance its performance. The various components are labelled for convenience of illustration, and the general limits of movement of the shock wave are designated by the characters $S_1$ and $S_2$. Direction of main gas flow is designated by solid arrows, and bleed gas flow by broken line arrows. A device having the dimensions shown in FIGURE 4, has resulted in very satisfactory regulation.

Figure 5:
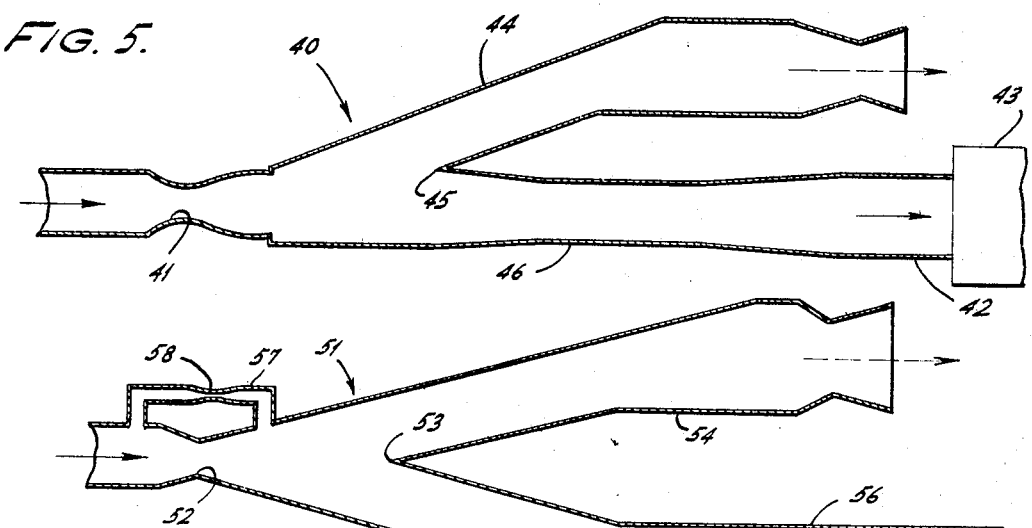
FIGURES 5, 6, 7 and 8 are fragmentary sectional views of additional modified embodiments of the invention.

With reference to FIGURE 5, a modified embodiment of the pressure regulator itself is designated generally by the numeral 40, and comprises a primary gas flow nozzle 41, a bias flow pressurization passage 42 for connecting the regulator to a region to be controlled, for example a receiver tank 43, and a non-bias-flow bleed gas passage 44 separated from the other passage by a flow divider 45. A lesser cross-section region 46 of the pressurization passage 42, beginning at flow divider 45, comprises a supersonic diffuser.

In operation of regulator 40, gas flow normally is directed from nozzle 41 through pressurization passage 42 until pressure in the receiver tank 43 equals the total pressure recovery of supersonic diffuser 46, a shock wave being formed in the region of flow divider 45. A slight additional increase in pressure in passage 42 drives the shock wave upstream of flow divider 45 to the region of the nozzle outlet, causing an increase in gas flow through bleed gas passage 44. Conversely, a decrease in pressure in passage 42 cause the shock wave to move downstream to the region of flow divider 45, and gas will again flow through pressurization passage 42.

Figure 6:

A further modification of the invention is illustrated in FIGURE 6, in which pressure regulator 51 comprises a primary supersonic gas flow nozzle 52, a gas flow divider 53, a bleed gas passage 54, a supersonic diffuser 55, and a pressurization passage 56 for a receiver tank or the like (not shown) within which pressure is to be regulated. The aforementioned elements in combination comprise a bi-stable fluid flow device, and there is further included a control flow passage 57 provided with a nozzle 58. Control passage 57 serves a secondary memory element to ensure that primary gas flow is deflected to the pressurization passage 56, as required, to maintain pressure within a tank or the like undergoing regulation.

In operation, a receiver tank to be pressurized is fed by passage 56 until the predetermined upper pressure limit is attained. Flow through passage 56 is ensured by feeding a portion of the gas from the source through passage 57 and directing a gas jet therefrom transversely of the path of gas flow from primary nozzle 52. Upon attaining the upper pressure limit of the tank undergoing pressure control, the shock wave which is formed at the entrance of diffuser 55 is moved upstream to a position just downstream of nozzle 52. Gas flow is then transferred from passage 56 to bleed passage 54. When gas pressure in the receiver tank reaches a predetermined lower limit, the shock wave again is driven downstream to the region of the entrance of diffuser 55, and the flow of gas from control passage 57 assists in switching flow from bleed gas passage 54 to pressurization passage 56.

Figure 7:
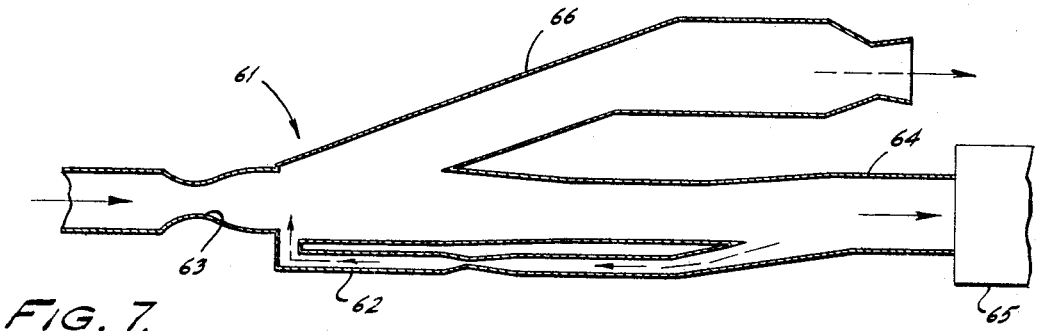

A still further modification of the invention is illustrated in FIGURE 7, in which the regulator 61 is similar to regulator 41 shown in FIGURE 5, and further includes a restricted control passage 62 leading from a region just downstream of primmary nozzle 63 to pressurization passage 64. In operation, gas flow is normally through nozzle 63, passage 64, past the end openings of control passage 62, and into tank 65. A predetermined increase in pressure in the receiver tank 65 will also increase pressure in passage 64 and in the passage 62 to the right of its restriction, causing a jet of gas to be fed from passage 62, as shown by the broken line arrows applied to this pasage. This flow from passage 62 is transverse the flow of gas from nozzle 63 through passage 64, and will deflect some of the gas flowing the nozzle 63 to flow through bleed gas passage 66 instead of through passage 64

Figure 8:
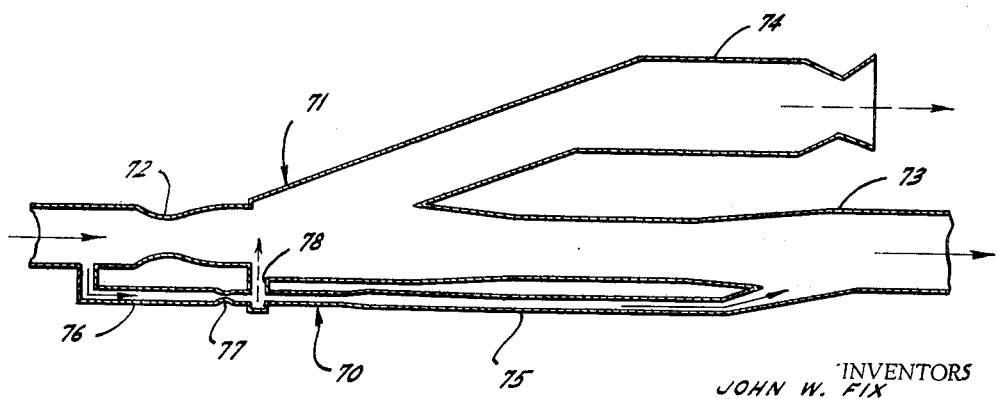

With regard to the embodiment of the invention seen in FIGURE 8, a fluid pressure regulator 70 is positioned and arranged to control flow through a monostable fluid flow device 71, which elements comprise, generally, a beam deflector fluid amplifier. In this construction pressurization flow normally is through nozzle 72 and conduit 73. The regulator 70 is connected at its outlet end 75 to conduit 73, and at its inlet 76 to a region of device 71 just upstream of nozzle 72. A nozzle 77 is provided between inlet 76 and outlet 75 and is disposed just upstream of a bleed port 78, directed to discharge a stream of gas transversely of the gas flow path leaving nozzle 72.

In operation of this device, gas will flow at the lower pressure condition through nozzle 72 and passage 73 in parallel with flow through the gas flow circuit 70 comprising inlet 76, nozzle 77, and outlet 75. When a predetermined upper pressure limit is reached in passage 73, the pressure in outlet 75 will rise sufficient to divert flow through bleed passage. The gas stream then issuing from passage 78 will deflect the main gas stream from its flow through passage 73 to flow through bleed passage 74. When a predetermined lower pressure limit is reached in passage 73, the pressure in outlet 75 will be reduced, restoring flow therethrough and halting flow through bleed passage 78. This in turn will permit flow to switch from bleed passage 74 to pressurization passage 73. This cycle of operation will be repeated as required by the means (not shown) undergoing regulation.

From the foregoing it will be appreciated that the invention affords a device for controlling pressure with gas generators, such as are used in guided missiles, that exhibits fast response and offers a high degree of reliability under very high accelerative loading. The device provides an lement which can be used on systems that have high required flow rates and small pressure control (ullage) volumes. Moreover, apparatus made according to the invention is capable of accurately regulating pressure over its complete flow range, and over a wide range of environments.

We claim:

1. Apparatus for maintaining constant gaseous pressure in a receiver, comprising: a nozzle for discharging gas under pressure at supersonic velocity; a supersonic diffuser disposed downstream of said nozzle, in spaced relation thereto, and adapted to direct gas into such receiver to be maintained at a predetermined pressure level; duct means interconnecting said nozzle and said diffuser; and conduit means communicating with said duct means in a region thereof intermediate said nozzle and said diffuser, said duct means, said nozzle and said diffuser being in such cooperable disposition as to be effective, in the presence of supersonic gas flow, to accommodate formation of a shock wave movable between the region of the inlet to said diffuser and the region of the outlet of said nozzle, in response to changes in gas pressure at the outlet of said diffuser and corresponding to pressures in such receiver, whereby gas is caused to flow through the diffuser when the shock wave is positioned in the region of the inlet of diffuser, and is caused to flow through the conduit means when the shock wave is positioned in the region of the outlet of the nozzle.

2. Apparatus according to claim 1, and characterized in that said conduit means comprises a generally annular conduit disposed about and in gas flow communication with said duct means.

3. Apparatus according to claim 1, and characterized in that flow divider means is interposed between said supersonic diffuser and said conduit means.

4. Apparatus according to claim 3 and characterized further in that said combination of conduit means and diffuser comprises a monostable fluidic device.

5. Apparatus according to claim 3 and characterized further in that said combination of conduit means and diffuser comprises a bistable fluidic device.

6. In combination with means for supplying gas at a relatively high pressure to receiver means for utilizing such gas at a relatively low pressure, a gas flow control device comprising: a nozzle for receiving such gas at relatively high pressure and effective to discharge such gas at supersonic velocity; means defining a supersonic diffuser disposed downstream of said nozzle, in spaced relation thereto, and adapted to direct gas into such receiver means; means defining a duct interconnecting said nozzle and said diffuser; and means defining a conduit communicating with said duct in a region thereof intermediate said nozzle and said supersonic diffuser; said combination further being characterized in that said duct, said nozzle, and said diffuser are in such cooperable disposition as to be effective, in the presence of supersonic gas flow, to accommodate formation of a shock wave movable between the region of the inlet to said diffuser, and the region of the outlet of said nozzle, in response to changes in gas pressure at the outlet of said diffuser and corresponding to pressures in such receiver, whereby gas is caused to flow through the diffuser when the shock wave is positioned in the region of the inlet to the diffuser, and is caused to flow through the conduit means when the wave is positioned in the region of the outlet of the nozzle.

References Cited

UNITED STATES PATENTS

| | | | |
|---|---|---|---|
| 1,973,714 | 9/1934 | Justheim | 230—92 |
| 2,000,741 | 5/1935 | Buckland | 230—92 |
| 2,795,931 | 6/1957 | Le Foll | 138—44 |
| 3,144,309 | 8/1964 | Sparrow | 137—81.5 X |
| 3,153,934 | 10/1964 | Reilly | 137—81.5 |
| 3,176,920 | 4/1965 | Severson | 137—81.5 |
| 3,292,623 | 12/1966 | Warren | 137—81.5 |
| 3,335,737 | 8/1967 | Gesell | 137—81.5 |

M. CARY NELSON, Primary Examiner

W. R. CLINE, Assistant Examiner